Oct. 11, 1960  E. HENNIGES  2,955,883
LUBRICATING CUSHION ASSEMBLY ESPECIALLY
FOR AXLE BEARINGS OF RAIL VEHICLES
Filed July 8, 1958  2 Sheets-Sheet 1
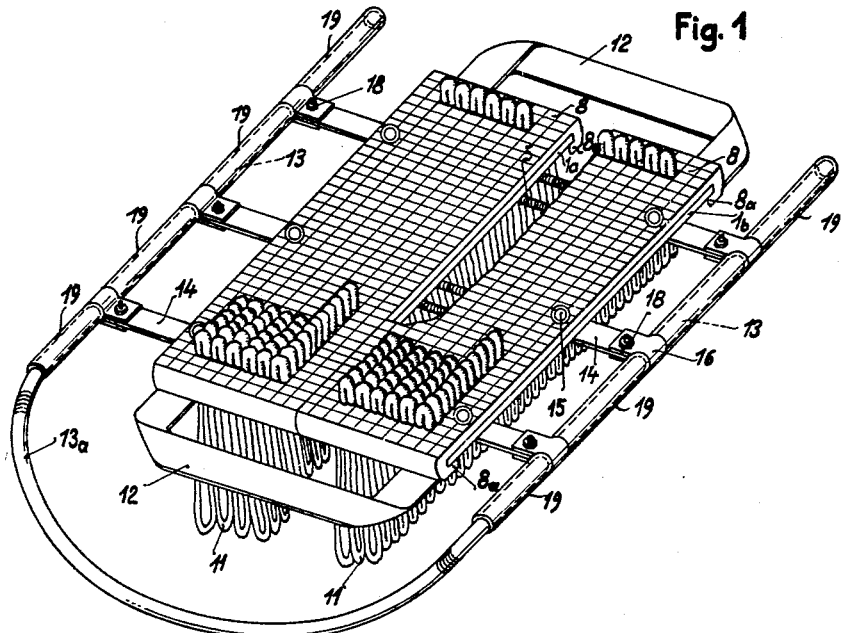
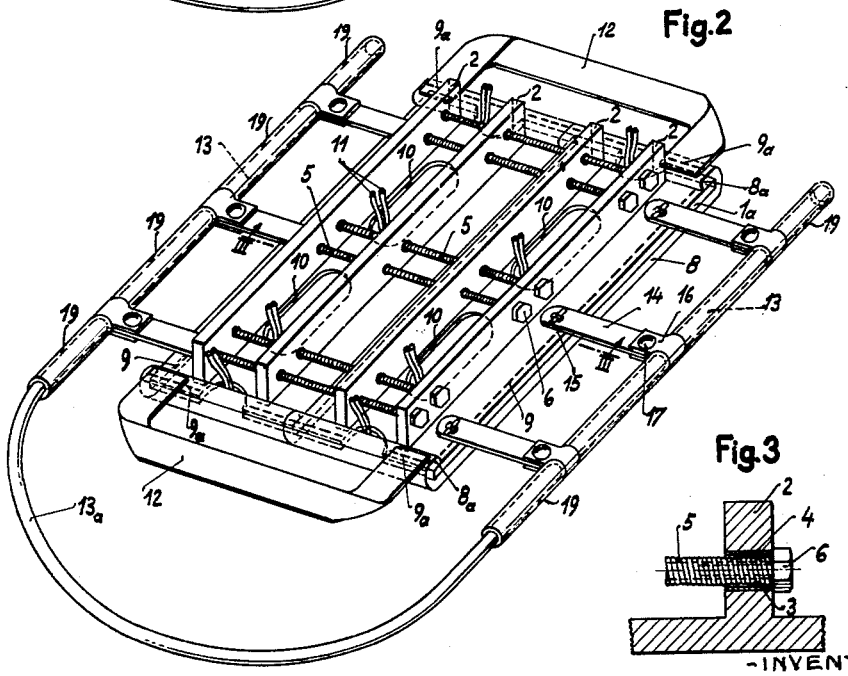
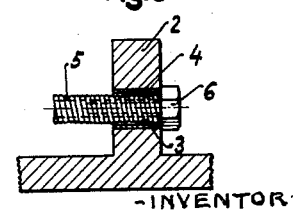
INVENTOR
Ernst Henniges

United States Patent Office 2,955,883
Patented Oct. 11, 1960

2,955,883

LUBRICATING CUSHION ASSEMBLY ESPECIALLY FOR AXLE BEARINGS OF RAIL VEHICLES

Ernst Henniges, Hannover, Germany, assignor to Gerda C. M. L. Runknagel, nee Nentwig, Northridge, Calif.

Filed July 8, 1958, Ser. No. 747,274

Claims priority, application Germany July 10, 1957

4 Claims. (Cl. 308—88)

The invention relates to a lubricating cushion assembly, especially for axle bearings of rail vehicles, which consists of a lubricating cushion adapted to be slipped into an axle-bearing housing under an axle journal and having a plush-like pile fabric fixed on a yieldable non-absorbent plate-shaped support of oil-resistant synthetic rubber or a similar material, and with bundles of absorbent threads extending from said pile fabric through holes in said support, the support being resiliently pressed with the pile fabric against the under side of the axle journal by tensioning elements extending transversely to the axle journal.

In the lubricating cushion assemblies heretofore known, the tensioning elements, generally constructed as spiral springs, are directly connected to flexible side portions either of a frame which is slidable in rigid holders, such as longitudinally slit tubes on the longitudinal inner side walls of the axle-bearing housing, or of a carrier frame flexible in longitudinal and transverse direction, which, without rigid connection with the axle-bearing housing, can be slipped loosely under the axle journal on the bottom of the bearing housing. The usual type of resilient suspension of the lubricating cushion is open to the objection that, in practical use, as the axle journal revolves more or less quickly, the lubricating cushion is shifted more or less far out of its normal position. Repeated changes in the number of revolutions per second of the axle causes the lubricating cushion to carry out continuous lateral oscillating movements, as a result of which the tensioning elements fatigue prematurely and the pile fabric wears rapidly. These lateral oscillating movements are detrimental for the lubricating operation in that the lubricating cushion does not bear absolutely centrally against the underside of the axle journal and parts of the surface of the pile fabric are at times not fully utilized for the lubrication. The eccentric displacement of the lubricating cushion and the lateral oscillating movements under the rotary movement of the axle become apparent to a greater extent because the tensioning elements must be made yieldably resilient to permit the lubricating cushion assembly to be inserted and withdrawn past the axle journal collar.

The object of the invention is to alleviate the above-mentioned objections of the lubricating cushion assemblies heretofore known in which the lubricating cushion is resiliently suspended by tensioning elements extending transversely to the axle journal. This is attained according to the invention in that the plate-shaped support and the lubricating cushion are divided in the longitudinal direction of the axle into two halves preferably uniform in size, and each of the two halves of the support is secured against displacement movements transversely to the axle journal by resilient spacer members mounted on neighboring flexible side portions of a carrier frame. The frame may be arranged to be slipped into rigid holders on the longitudinal inner side walls of the axle-bearing housing or, alternatively, the frame may be constructed to be placed under the axle journal on the bottom of the axle-bearing housing.

When inserting a lubricating cushion assembly constructed according to the invention under the axle journal, the two halves of the lubricating cushion spread apart as the tensioning elements yield elastically, so that the lubricating cushion can be brought past the collar of the axle journal into the axle bearing without any difficulty. The transverse tensioning elements such as spiral springs, which resiliently press the lubricating cushion against the underside of the axle journal, are always under uniform tension and are not periodically overstressed, which would lead to the danger of breakage and a rapid weakening of the tensional force of these springs. The lubricating cushion assembly according to the invention therefore offers the advantage of greater constancy of performance and longer life, and also ensures always uniform lubrication of the axle journal, utilizing the whole surface of the pile fabric bearing absolutely concentrically against the underside of the axle journal.

Leaf springs yieldable in vertical direction can be used advantageously as spacer members. These springs, on the one hand, contribute to uniformly pressing all portions of the surface of the pile fabric against the axle journal in that they additionally press the edge zones of the fabric against the underside of the axle journal. On the other hand, as they are yieldable in vertical direction, the leaf springs facilitate the insertion of the lubricating cushion assembly into the axle-bearing housing and its withdrawal therefrom.

Other features and advantages of the present invention, especially when applied to lubricating cushions resiliently suspended on a frame which is capable of being slipped into rigid holders in the axle journal housing, will be readily apparent from the following description when read in conjunction with the accompanying drawings showing by way of example a preferred embodiment of the invention. In these drawings:

Fig. 1 is a perspective view seen from above, showing a lubricating cushion assembly with bundles of absorbent threads, in unstretched state before being slipped into an axle-bearing housing;

Fig. 2 is a perspective view seen from below, showing the lubricating cushion assembly of Fig. 1 with the bundles of absorbent threads only partly indicated;

Figure 4:
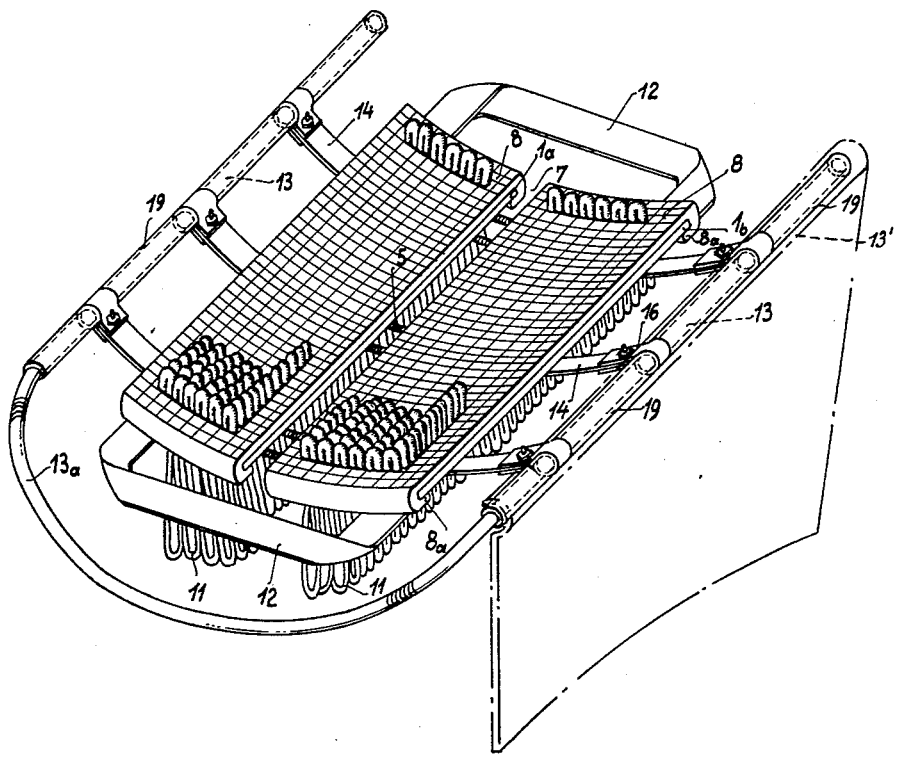

Fig. 3 is a fragmentary cross section, on a larger scale, taken on line III—III of Fig. 2, illustrating the mounting of one of a number of transverse springs which elastically yieldably hold the lubricating cushion split in two halves, and Fig. 4 is a view similar to Fig. 1, but showing the lubricating cushion assembly in substantially the stretched position assumed being fitted in an axle-bearing housing, not shown.

As shown in the drawings, a yieldable plate-shaped support made from oil-resistant synthetic rubber or a similar material is, according to the invention, divided into two longitudinal halves $1_a$ and $1_b$ preferably of the same size. Each of the two halves of the support has on its underside two longitudinal ribs 2 extending parallel to the longitudinal edges of the support and in which several, for example six transverse bores 3 reinforced by metal sleeves 4 are drilled for accommodating spiral springs 5. The spiral springs 5 are secured under slight tension to the two outer longitudinal ribs 2 of the halves $1_a$ and $1_b$ of the support by means of bolts 6 which are screwed from the outer side of the ribs into the spiral springs 5, as shown in Fig. 3. The spiral springs 5 are suitably distributed over the length of the two-part support and resiliently hold together the halves $1_a$ and $1_b$. Due to the expansibility of the spiral springs 5, the halves can be drawn apart so that their inner longitudinal edges are separated and a gap 7 is formed between them as can be seen from Fig. 4.

Each of the halves $1_a$ and $1_b$ of the support is covered on its upper side with a plush-like pile fabric 8 which has ends $8_a$ folded over the transverse edges of the support and is firmly connected with the support by seams 9, extending adjacent the longitudinal edges of the halves $1_a$ and $1_b$, and by short transverse seams $9_a$. Bundles of absorbent threads 11 are passed in known manner from the pile fabric 8 through slots 10 in the halves $1_a$ and $1_b$ of the plate-shaped support, which threads are adapted to extend into an oil sump in the lower part of an axle-bearing housing, not shown on the drawings, to saturate the pile fabric 8 with lubricating oil. Band strips 12 sewn on to the two ends of the pile fabric 8 form a means for pulling the lubricating cushion out of the axle bearing housing. Before the lubricating cushion is used for the first time, the strips 12 also serve for suspending the cushion when it is immersed in a bath of lubricating oil for a predetermined time in order to become thoroughly saturated and for subsequently handing it up to allow the surplus oil to drip off.

The two-part lubricating cushion above described is connected to resilient side portions 13 of a frame flexible in longitudinal and transverse direction. Extending between these side portions 13 and the plate-shaped support are spacers which, in the example illustrated, consist of resilient steel strips or leaf springs 14. The inner ends of these leaf springs 14 are each hinged by means of a split rivet 15 passing through vertical bores in the pile fabric 8 and the support $1_a$ and $1_b$ adjacent the outer edges of the lubricating cushion, whereas the outer ends of the leaf springs are held by clamping collars or clips 16 placed around the side portions 13 and secured by bolts 17 and nuts 18 in such a manner that the springs 14 can be swung laterally in relation to the clips in overcoming the clamping friction. The leaf springs 14 hold the two lubricating cushion halves at a certain distance from the resilient side portions 13 so that the halves of the lubricating cushion when pulled apart by the stretching of the transverse springs 5, bear absolutely concentrically against the underside of the axle journal. The leaf springs 14 press the outer edge zones of the two lubricating cushion halves against the underside of the axle journal with substantially the same pressure as that with which the tensioned transverse springs 5 press the middle and inner surface zones of the two lubricating cushion halves against the axle journal. Owing to the elastic yieldability of the leaf springs 14 in vertical direction, the introduction and withdrawal of the lubricating cushion assembly past the axle journal collar are greatly facilitated.

When the lubricating cushion assembly is in operative position, the transverse springs 5 are always under constant tension and, as transverse displacement of the halves of the lubricating cushion is prevented by the leaf springs 14, cannot be overstressed. Consequently there is no danger of premature fatigue or fracture of the springs 5.

In the example illustrated, the two resilient side portions 13 and a curved connecting portion $13_a$ are produced from a single spiral spring so as to form a substantially U-shaped frame which can be inserted in rigid holding members, for example longitudinally split tubes (a fragmentary portion of one being shown at 13' in Fig. 4) on the inner longitudinal sides of the axle-bearing housing. To prevent the clips 16 which grip the lateral portions 13 of the frame, from getting in the way when inserting the assembly, plastic tubes 19 are slipped with force fit onto the sections of the spiral spring forming the flexible portions of the frame on each side of each clip, the external diameter of the tubes 19 being the same or slightly larger than the external diameter of the clips 16.

Owing to the fact that the leaf springs 14 can turn on their points of fixation, the lateral portions 13 of the lubricating cushion frame can be brought into such relative distance apart that their free ends can be introduced without difficulty into the split tubes or other holding members. However, the leaf springs 14 must not be swung too far out of their normal position to the flexible lateral portions 13 because otherwise they can no longer fulfill their function as spacer members. Nevertheless, the possibility of the leaf springs swinging through a small angle when the frame is being inserted, is sufficient for compensating any slight inaccuracies in the dimensions of the lubricating cushion occurring in the production thereof.

If the invention is applied to supporting frames which are placed loosely on the bottom of the axle-bearing housing without being connected by rigid holding members in the axle-bearing housing, the possibility of the spacers 14 being able to swing can be dispensed with and, while saving special clamping clips 16, the outer ends of the leaf springs 14 can then be merely bent round the longitudinal spiral springs 13 to form ring eyes held in clamping position by screw bolts 17. Also in this case, the construction of the spacers as leaf springs yieldable in vertical direction greatly facilitates the introduction and withdrawal of the lubricating cushion assembly and ensures that all parts of the surface of the pile fabric 8 are uniformly pressed against the underside of the axle journal.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A lubricating cushion assembly adapted for use in a bearing housing having spaced holding members for retaining the same therein, comprising a yieldable plate-like support of an oil resistant material, a cover of pile fabric secured to said support and having portions of absorbent threads extending downwardly from said pile fabric through portions of said support, said support and pile fabric each being divided in the longitudinal direction into two halves, tension elements extending transversely and yieldably connecting the two halves of the support to draw said support halves and pile fabric together, a frame having flexible side portions supporting said halves for receipt in the holding members, and spacing means yieldably connecting said side portions of said frame with the halves of said support and permitting relative movement of said halves with respect to said side portions.

2. A lubricating cushion assembly as set forth in claim 1; said spacing means comprising leaf springs extending laterally from said halves and secured to said frame side portions.

3. A lubricating cushion assembly as set forth in claim 1; said support frame comprising a U-shaped spring having legs providing said flexible side portions, flexible sleeves circumposed about said side portions, and clamping members secured to said sleeves and to one end of said spacing means.

4. A lubricating cushion assembly as set forth in claim 1; said supports including transverse bores adjacent the outer edges thereof, and means extending through said bores and said spacing means for securing the same thereto.

References Cited in the file of this patent

FOREIGN PATENTS

| 20,622 | Great Britain | 1910 |
| 1,122,090 | France | May 14, 1956 |